(12) United States Patent
Shell et al.

(10) Patent No.: US 7,194,503 B2
(45) Date of Patent: Mar. 20, 2007

(54) SYSTEM AND METHOD TO QUERY SETTINGS ON A MOBILE DEVICE

(75) Inventors: Scott R. Shell, Redmond, WA (US); Igor B. Peev, Seattle, WA (US); Yuhang Zhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 09/895,450

(22) Filed: Jun. 29, 2001

(65) Prior Publication Data

US 2003/0018764 A1 Jan. 23, 2003

(51) Int. Cl.
*G06F 15/16* (2006.01)
*G06F 3/00* (2006.01)
*G06F 9/00* (2006.01)
*H04M 9/00* (2006.01)
*H04Q 7/20* (2006.01)

(52) U.S. Cl. .............. 709/202; 455/403; 709/217; 719/315

(58) Field of Classification Search ........ 709/220–225, 709/217–219, 202; 455/403; 719/315
See application file for complete search history.

(56) References Cited

U.S. PATENT DOCUMENTS

| | | | |
|---|---|---|---|
| 5,794,142 A * | 8/1998 | Vanttila et al. | 455/419 |
| 6,006,091 A * | 12/1999 | Lupien | 455/435.1 |
| 6,029,065 A * | 2/2000 | Shah | 455/414.4 |
| 6,128,509 A * | 10/2000 | Veijola et al. | 455/556.1 |
| 6,223,028 B1 * | 4/2001 | Chang et al. | 455/419 |
| 6,301,484 B1 * | 10/2001 | Rogers et al. | 455/466 |
| 6,490,616 B1 * | 12/2002 | Maryka et al. | 709/222 |
| 6,549,771 B2 * | 4/2003 | Chang et al. | 455/419 |
| 6,587,450 B1 * | 7/2003 | Pasanen | 370/338 |
| 6,615,038 B1 * | 9/2003 | Moles et al. | 455/418 |
| 6,615,255 B1 * | 9/2003 | Blaszczak | 709/220 |
| 6,721,558 B1 * | 4/2004 | Saad | 455/424 |
| 6,754,470 B2 * | 6/2004 | Hendrickson et al. | 455/67.11 |
| 6,918,108 B2 * | 7/2005 | Rajaram | 717/126 |
| 6,999,781 B1 * | 2/2006 | Wallenius | 455/466 |

OTHER PUBLICATIONS

The definition of "parse" as presented at www.dictionary.com, 1pg., see definition 4.*
"Mobile Automation 3.1 Extends the Reach of Microsoft Systems Management Server 2.0;" *Newswire*, Jun. 14, 1999.

(Continued)

*Primary Examiner*—David Wiley
*Assistant Examiner*—George Neurauter, Jr.
(74) *Attorney, Agent, or Firm*—Merchant & Gould P.C.; Ryan T. Grace

(57) ABSTRACT

A provisioning system for receiving configuration changes to and queries of settings on a mobile device. The provisioning system may include a router, configuration manager and one or more configuration service providers. The router component is responsible for receiving messages delivered to the mobile device and parsing the messages into requests for information. The configuration manager component is responsible for determining what configuration settings are affected by the message and for processing the requests within the message. The configuration manager component may implement one or more configuration service providers to perform the actual request processing. The configuration manager component may additionally compose a response document to return in the event that a response has been requested in the message.

22 Claims, 7 Drawing Sheets

OTHER PUBLICATIONS

"Mobile Essentials 2.0 Creates Location Profiles; Symantec Corp Tool Creates Laptop Configuration Settings;" *Computing Canada* 25:29, Jul. 30, 1999, p. 27.

"Fundamental Software's Enterprise Configuration Manager 3.1 Extends Support to Windows NT/2000 Mobile Systems;" *Newswire*, Jul. 24, 2000, p. 2012.

* cited by examiner

```
                        QUERY DOCUMENT

X-WAP-Application-Id: [application id]
        X-WAP-Initiator-URI: initiator.airstream.com
        Content-Type: text/vnd.wap.connectivity-xml
        X-MS-RESP-ADDR: sms|123456@35809503401/devconfig?1122
        X-MS-RESP-TYPE: LLN <?xml version="1.0" encoding="UTF-8"?>
        <!DOCTYPE wap-provisioningdoc PUBLIC
        "http://schemas.microsoft.com/prov.dtd">
        <wap-provisioningdoc>

<characteristic type="Registry">
                <characteristic-query type=
                "HKCU\COMM\TerminalPreferences\Large"/>
            </characteristic>

<characteristic type="Locale">
                <parm-query name="LOCALE_IDIGITS"/>
                <parm-query name="LOCALE_SCURRENCY"/>
            </characteristic>

</wap-provisioningdoc>
```

*Fig. 5*

SYSTEM AND METHOD TO QUERY SETTINGS ON A MOBILE DEVICE

BACKGROUND OF THE INVENTION

The use of mobile electronics is growing by leaps and bounds. Mobile devices, such as cellular phones and personal digital assistants (PDAs), are transforming from relatively-simple single-function devices into complex devices with both telephone and PDA capabilities. With these improvements comes a greater need for configurability and maintenance. With each type of application or functionality installed on a mobile device comes additional configuration settings. In the past, configuration settings for the mobile device were set one time, such as during a "bootstrap provisioning" transaction, and either not changed or changed by manually activating a keypad or other input system on the mobile device, which of course requires physical access to the mobile device.

As these devices become more and more complex, there is a greater chance that configuration settings stored on the mobile device will need to be changed. For instance, a service provider may have a need to change the phone number to which the mobile device responds, or to modify a setting related to an e-mail application on the device. However, it may be important that the service provider know what the current settings on the mobile device are because in some circumstances settings can conflict between two applications or services. For that reason, it would be helpful if the service provider could discover the current state of any settings on the mobile device. Unfortunately, there is no existing mechanism known for remotely discovering what the existing configuration settings are.

Largely for those reasons, maintaining mobile devices in use by a mobile communications system is very burdensome. A typical maintenance scenario might be that a user calls a tech support contact (maybe the mobile operator or maybe a corporate helpdesk) and complains about a problem. The current remedy is for the support technician to walk the user through a long complicated series of steps to determine the current configuration of the mobile device, and then walks the user through a number of steps to fix the configuration. This is obviously a very tedious process, labor intensive, and prone to human error.

Additionally, in an effort to control the total cost of ownership (TCO) of running complicated devices, the mobile device may be configured so that the end user does not have permission to view or modify the settings which are involved in their problem. In order to control TCO and prevent the user from corrupting the settings, end user access to the settings can be controlled. In that case, the support technician requires this functionality in order to correctly diagnose the problem. Until now, a solution to these problems has eluded those skilled in the art.

SUMMARY OF THE INVENTION

Briefly described, the present invention provides a system and method for querying a set of configuration settings on a mobile device. Advantageously, the system and method enable a mechanism for setting those configuration settings so that any changes may be compared to other settings and conflicts may be more easily avoided. In addition, the present invention avoids the existing need to transmit an entire set of configuration settings to the mobile device, and thereby avoid the increasing burden on the transmission medium.

In one aspect, the present invention provides a mechanism for transmitting a message from a service provider to a mobile device, the message being configured to cause the mobile device to return one or more identified configuration settings to the service provider. In one embodiment, the message may take the form of a markup language document that identifies one or more configuration settings. When evaluated at the mobile device, the markup language document causes a variable identified in the markup language document to be assigned values associated with the identified configuration settings. The mobile device then returns the markup language document to the service provider complete with the assigned values representing the current configuration settings of the mobile device. Advantageously, a support engineer or technician can directly query the settings on the mobile device and take corrective action without involving the user. This advantage saves time, as the support personnel are more productive, and limits user frustration, as their problem is solved promptly and correctly.

BRIEF DESCRIPTION OF THE DRAWINGS

FIG. 5 is a graphical representation of information within a query document used by the configuration system implementing the present invention.

DETAILED DESCRIPTION OF THE PREFERRED EMBODIMENT

An illustrative system and method for continuously provisioning or configuring a mobile device are described in the following. Briefly stated, an architecture is described that enables a query document to be sent to a mobile device. Mechanisms on the mobile device respond to the query document by returning values associated with the particular queries within the query document. The illustrative system and its environment are described first, followed by a description of certain methods employed by the illustrative system for performing the duties of querying settings on a mobile device. The terms "provisioning" and "configuring" or "configuration" may sometimes be used interchangeably throughout this document. There is no intended substantive distinction between those terms. Alternative constructions may be provided throughout but are not to be viewed as limiting. Other alternative constructions will also become apparent to those skilled in the art.

Illustrative Wireless Environment

Figure 1:
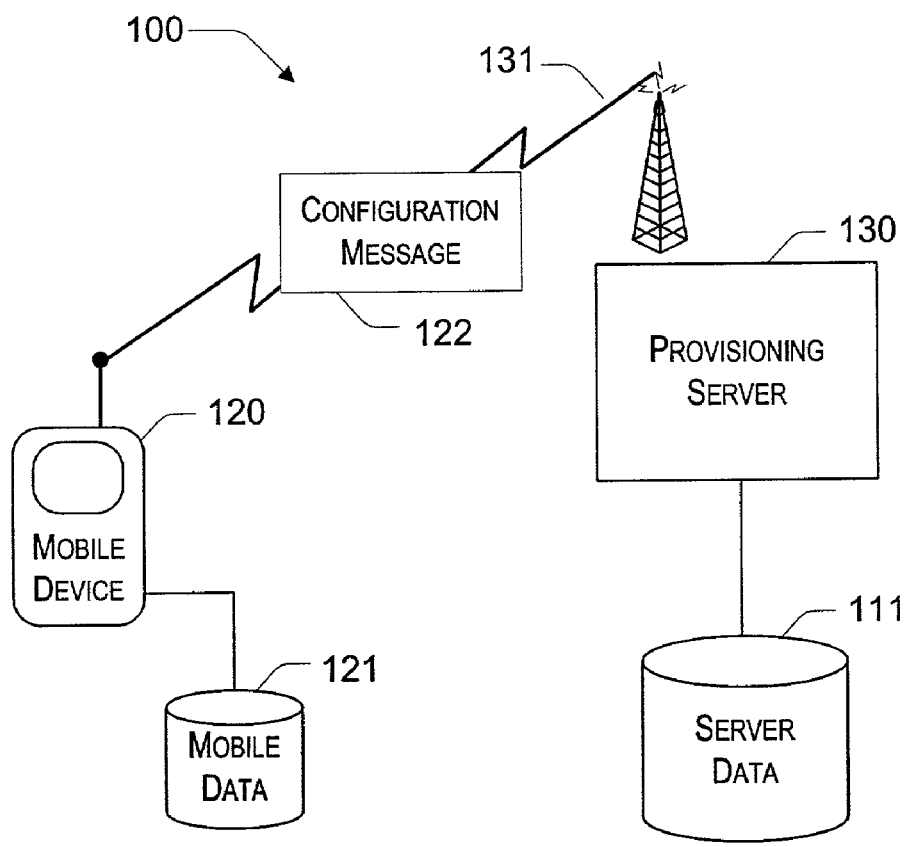
FIG. 1 is a functional block diagram of a wireless environment in which the present invention may be implemented.

FIG. 1 is a functional block diagram of a wireless environment 100 in which the present invention may be implemented. Principally, the wireless environment 100 includes a mobile device 120 in communication with a provisioning server 130 over a wireless link 131. The provisioning server 130 may be the principal point of connectivity for the mobile device 120, such as a public wireless service provider (e.g., a cellular carrier) or a private wireless communications network (e.g., a corporate communications network). Alternatively, the provisioning server 130 may be a dedicated provisioning server acting in cooperation with the principal point of connectivity. The provisioning server 130 may include a data store (server data 111) that contains information about the mobile device 120, such as the type and model of mobile device, any installed applications and their versions, service plan information, current configuration settings, and the like.

Although only one provisioning server 130 is illustrated in FIG. 1, there may be multiple servers in the system 100 that each perform provisioning functions on the mobile device 120. For example, one server (e.g., the provisioning server 130) may be responsible for maintaining device-specific information about the mobile device 130, such as the device's identification or phone number. There may be another server, such as a software vendor's maintenance server, responsible for the maintenance and upgrading of installed software on the mobile device 120. Moreover, there may be yet another server, such as a corporate network server, responsible for maintaining configuration information used by a system for keeping the mobile device synchronized with the corporate network. In short, there may be many sources of provisioning information attempting to access the mobile device 120. For this reason, one of the provisioning sources may have no knowledge about configuration settings on the mobile device 130 maintained by another provisioning source.

The mobile device 120 is illustrated in detail in FIGS. 2 and 3 and described below. Briefly described, the mobile device 120 is a handheld computing device that includes the functionality of a mobile telephone as well as the functionality of a typical Personal Digital Assistant (PDA). The mobile device 120 contains software, such as an operating system, several installed applications, communications software, and the like. The mobile device 120 also includes a data store (mobile data 121) that contains information used by the mobile device 120 in operation. Configuration settings for many of those components are stored in the mobile data 121.

The provisioning server 130 and the mobile device 120 communicate with each other over a wireless link 131, which may be any means for wireless communications, such as a radio frequency link, a Short Messaging Service (SMS) system, or the like. The provisioning server 130 transmits and receives configuration messages (e.g., configuration message 122) to and from the mobile device 120 over the wireless link 131. The configuration message 122 may take various forms and include either or both queries of configuration values or statements setting configuration values. A configuration message including setting queries (a "query document") is illustrated in detail in FIG. 5 and described below. A configuration message that includes responses to queries (a "response document") is illustrated in detail in FIG. 6 and described below. Briefly described, the configuration messages are markup language documents, such as an eXtensible Markup Language (XML) document, that include instructions for querying or altering configuration settings stored on the mobile device 120.

Although described here principally in the context of configuration messages being delivered over a wireless link 131, it will be appreciated that this is one likely implementation. Other implementations will also become apparent, such as delivering configuration messages to the mobile device 120 via a wired connection, such as a docking station or a synchronization cradle. In addition, nothing in the present invention excludes the ability to make configuration queries on the mobile device 120 using input mechanisms directly on the mobile device 120, such as a keypad or touch-sensitive display screen.

Mobile Computing Device Implementing the Present Invention

Figure 2:
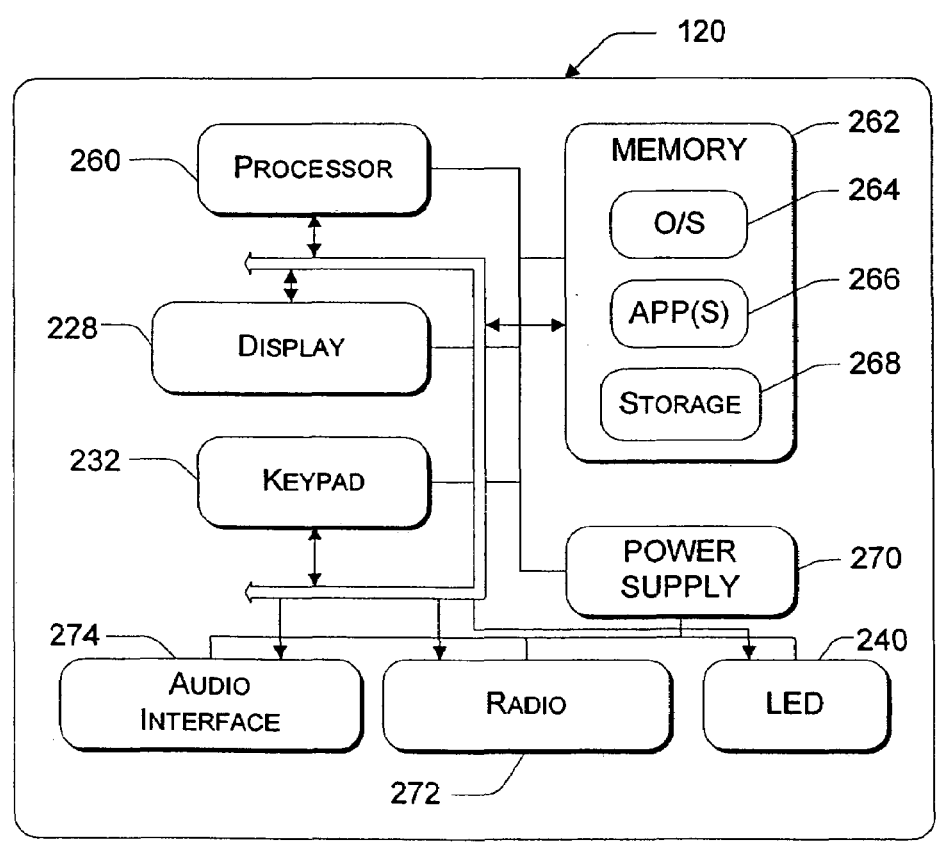
FIG. 2 is a functional block diagram of an illustrative mobile device which may be used to implement one embodiment of the present invention.

FIG. 2 is a functional block diagram illustrating components of a sample mobile device 120 adapted for use in one implementation of the present invention. The mobile device 120 has a processor 260, a memory 262, a display 228, and a keypad 232. The memory 262 generally includes both volatile memory (e.g., RAM) and non-volatile memory (e.g., ROM, Flash Memory, or the like). The mobile device 120 includes an operating system 264 which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile device 120 also includes non-volatile storage 268 within the memory 262. The non-volatile storage 268 may be used to store information which should not be lost if the mobile device 120 is powered down. The applications 266 may use and store information in the storage 268, such as e-mail or other messages used by an e-mail application, contact information used by a PIM, appointment information used by a scheduling program, documents used by a word processing application, and the like. A synchronization application may also reside on the mobile device and may be programmed to interact with a corresponding synchronization application resident on a host computer to keep the information stored in the storage 268 synchronized with corresponding information stored at the host computer.

The mobile device 120 has a power supply 270, which may be implemented as one or more batteries. The power supply 270 might further include an external power source, such as an AC adapter or a powered docking cradle, that supplements or recharges the batteries.

The mobile device 120 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile device 120 also includes a radio 272 that performs the function of transmitting and receiving radio frequency communications. The radio 272 facilitates wireless connectivity between the mobile device 120 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 120 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
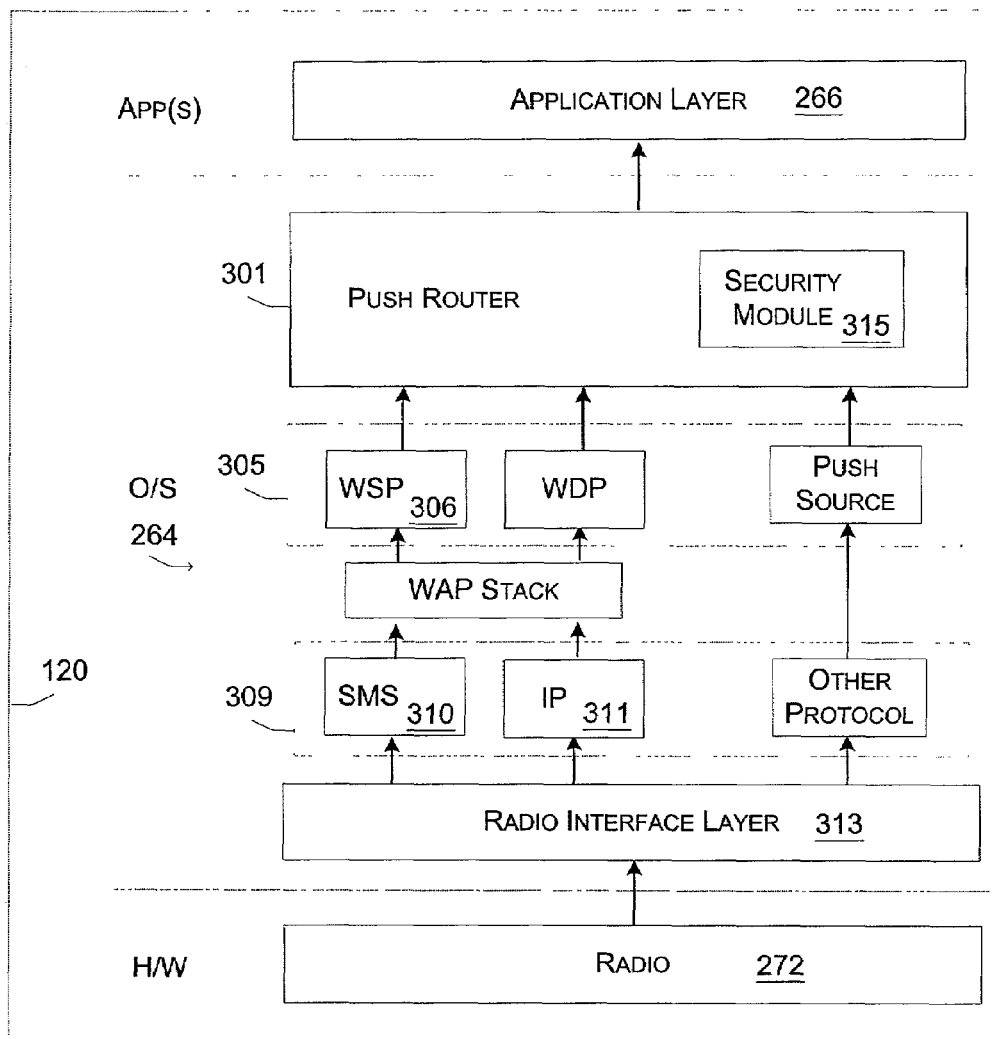
FIG. 3 is a functional block diagram of illustrative software components that implement one embodiment of the present invention.

FIG. 3 is a functional block diagram of illustrative software components on the mobile device 120 that implement the present invention. This implementation of the invention is described in the general context of computer-executable instructions or components, such as software modules, being executed on a mobile computing device. Generally, computer-executable components include routines, procedures, programs, objects, modules, data structures, and the like that perform particular tasks or implement particular abstract data types. Although described here in terms of computer-executable instructions or components, the invention may equally be implemented using programmatic mechanisms other than software, such as firmware or special purpose logic circuits.

Illustrated in FIG. 3 are the radio 272, the applications 266, and, in greater detail, portions of the operating system 264. It will be appreciated that although several components are illustrated as portions of the operating system 264, it is possible to implement the functionality of those components outside of the operating system 264, such as within one or more of the applications 266. The several illustrated components of the operating system 264 include a push router 301, push sources 305, a transport layer 309, and a radio interface layer 313. Essentially, the radio 272 and the radio interface layer 313 act in concert to transmit and receive messages, including configuration messages. The radio interface layer 313 is a software component that interfaces with the radio hardware (radio 272) and exposes a common set of software functions to the other components of the operating system 264. In this way, developers may create software to take advantage of any type of radio hardware by interacting with the common interfaces presented by the radio interface layer 313, rather than directly with the radio 272. This functionality greatly simplifies the task of developing software for use with practically any radio hardware.

The transport layer 309 includes one or more transports that are configured to pass messages to and receive messages from the radio interface layer 313 in one or more communications protocols. For example, the SMS transport 310 is programmed to receive and transmit messages formatted using the Short Message Service (SMS), as defined by GSM specifications (including GSM 03.40). Similarly, the IP transport 311 is programmed to receive and transmit messages formatted using the Internet Protocol (IP). Other transports may also be used, as will be understood by those skilled in the art, and the transports shown are for illustrative purposes only. Configuration messages are transmitted to and from the mobile device 120 over one or more of the transports in the transport layer 309.

The push sources 305 are software components configured to receive messages, such as configuration messages, from a configuration message initiator (e.g., the provisioning server 130), via a corresponding transport, and make the message available to the push router 301. In this implementation of the invention, configuration messages are delivered over any one or more of the transports, such as the SMS transport 310, and presented to the push router 301 using any one or more of the push sources, such as the WSP push source 306, a Subscriber Identity Module (SIM) file source, a local file push source, an HTTP push source, or the like. Typically, a push source is associated with a corresponding transport.

The push router 301 is a software component configured to receive incoming messages from each of the push sources 305 and to route the incoming messages to the proper application registered to receive them. For example, an application in the application layer 266 may be registered to receive messages delivered over the SMS transport 310. In that case, messages intended for the registered application are received over the SMS transport 310, delivered to the WSP push source 306, and then delivered to the push router 301. The push router 301 finally passes the messages to the registered application. Incoming messages, including those that carry provisioning information, are received by the push router 301. The push router 301 includes procedures to decompose and parse the received messages to identify a target application and to pass the payload (e.g., the data portion of the message) to the target application. Moreover, the push router 301 is configured to transmit messages over the transports in response to application requests. The push router 301 is also configured to determine if a response has been requested to any incoming configuration messages and to pass that information along to the target application. The push router 301 may also include the type of response requested and a response destination address. Information identifying the target applications may be maintained in one or more tables, such as an open handle table and a registration table (not shown).

The push router 301 may include a security module 315 responsible for performing certain security validation functions on incoming messages. For example, the security module 315 may authenticate and decrypt incoming messages to identify the source of the message. The security module 315 may also be configured to assign a security role to each incoming message based on the source of the message and possibly an encryption key used to decrypt the message content.

Figure 4:
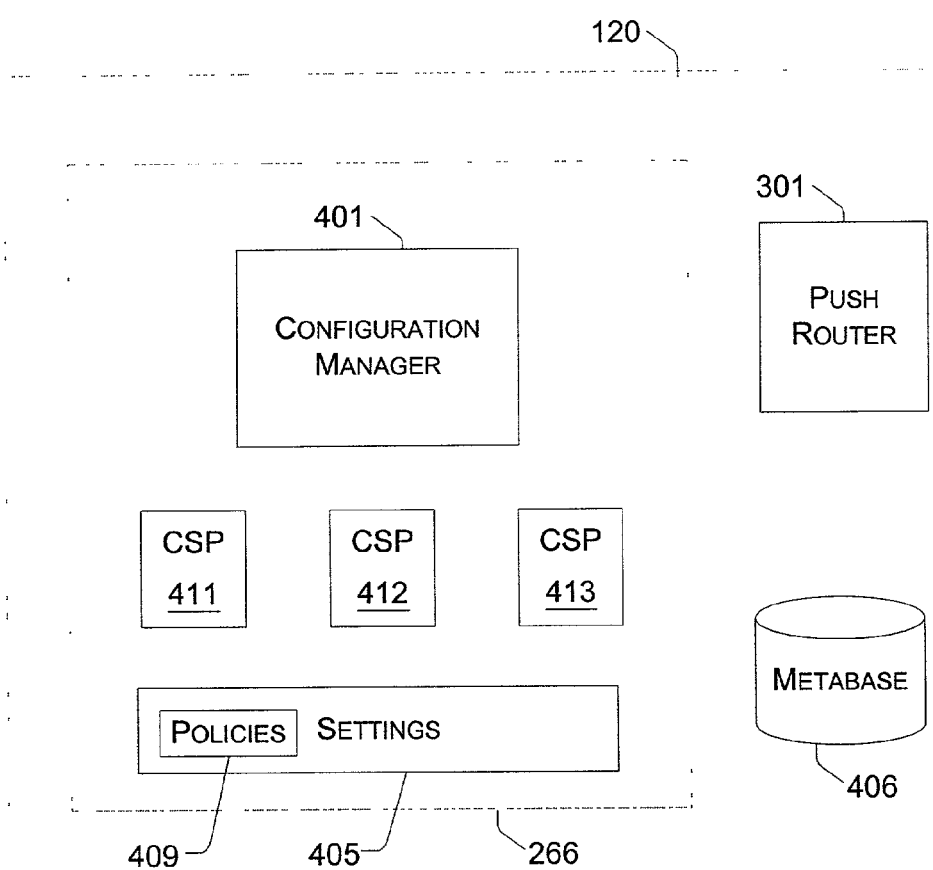
FIG. 4 is a functional block diagram illustrating in greater detail certain software components that operate within the application layer of the embodiment of the invention illustrated in FIG. 3.

FIG. 4 is a functional block diagram illustrating in greater detail certain software components that operate within the application layer 266. In this embodiment, several configuration settings (settings 405) are shown within the application layer 266 for simplicity. It will be appreciated that the settings 405 may reside in multiple places, such as in the application layer 266, within the operating system 264, or in any other location. The settings 405 may be grouped or associated with one or more other components. For example, an e-mail application may have a group of configuration settings within the settings 405, and the operating system 264 may have another group of configuration settings within the settings 405. The metabase 406 contains specific information about the settings, their possible values, clues on how to display them and other relevant metadata about them. The metabase 406 may also contain role requirements and mappings for each setting.

Each of the configuration settings within the settings 405 is associated with a Configuration Service Provider (CSP) 411–413. Each CSP 411–413 is essentially a special-purpose software module that is responsible for maintaining a particular group of settings. In one embodiment, each configuration setting may be uniquely defined by its path through a tree. For example, consider the following sample XML statements:

```
<characteristic type="foo">
    <characteristic type="bar">
        <parm name="blah" value="5"/>
    </characteristic>
</characteristic>
```

The configuration setting identified in these sample statements is identified by it's full path: foo\bar\blah. The first part of the path for a setting (in this case "foo") identifies the CSP. In this way, the CSP is explicitly identified as a part of the path to the configuration setting. Of course, other schemes for identifying CSPs will become apparent to those skilled in the art.

The CSPs 411–413 are responsible for actually executing specific configuration instructions that may be included in a configuration message. The CSPs 411–413 are trusted components that may query, alter, or delete the settings for which they are responsible. For instance, one application, such as an e-mail application, may have a dedicated CSP (e.g., CSP 411) for maintaining settings associated with the e-mail application. The CSPs 411–413 receive instruction from an application (e.g., a "configuration manager" described below) that manages the configuration transaction and may coordinate among several CSPs. The CSP may also return an existing value for a setting if requested. Each CSP could have a hardcoded condition which must be satisfied prior to deleting the values of any protected parameter from a response document or a mirrored query document that they generate. This condition should prevent an attempt to query a password on the device.

The configuration manager 401 is the hub of activity for the over-the-air configuration system. Essentially, it is an application registered to handle configuration messages for the mobile device 120. As mentioned above, the push router 301 passes received messages to one or more applications 266 that are registered to receive them. In this case, the configuration manager 401 is the application registered to handle configuration messages. Thus, when the push router 301 receives a configuration message, the push router 301 passes the message (or at least the configuration payload of the message) to the configuration manager 401.

The configuration manager 401 is programmed to parse the incoming configuration messages to identify the affected configuration settings. For example, one configuration message may contain changes to settings related to an e-mail application, while another configuration message may contain changes to settings related to the addresses of trusted proxy servers. Moreover, a single configuration message may contain changes that affect several different groups of settings. The configuration manager 401 is programmed to determine which one or more CSPs are responsible for maintaining the affected settings. In the disclosed embodiment, that determination is made directly from information within the configuration message which identifies the appropriate CSPs. Alternatively, the configuration manager 401 could identify the appropriate CSPs from other information that associates CSPs with corresponding configuration settings.

Documents Used by the System

In accordance with this implementation of the invention, the configuration messages are based on a declaratory syntax rather than an instructional syntax. In other words, rather than putting forth statements which request that an action be performed (e.g., "make setting_value=X"), the declaratory syntax allows changes to be set forth as declarations of state (e.g., "setting_value=X"). This distinction provides some unforeseen advantages over an instructional syntax, namely that a configuration message essentially describes the state of the affected settings after the provisioning transaction, and may therefore be used as a response document as well. For instance, if the provisioning transaction completes without error, the configuration message may essentially be returned unchanged to indicate the success, with the exception of query statements being modified to reflect the value of the queried setting. This feature greatly simplifies the maintenance of the configuration message throughout the provisioning transaction and simplifies the creation of a response document.

To that end, what follows is a discussion of two sample configuration messages in accordance with the invention: a query document and a response document. The query document is described in the context of a configuration message that may be transmitted to a mobile device with instructions to query existing settings on the mobile device. It will be apparent that the query document could also include many other statements, such as those changing settings on the mobile device. The sample query document is limited to query statements for the purpose of simplicity of illustration only, and it is expected that in practice a query document will be much more complex and include many other types of statements. A sample response document is also provided to illustrate the declaratory syntax used in this implementation and its advantages.

Sample Query Document

FIG. 5 is a graphical representation of one sample query document 500 that may be used in connection with one implementation of the present invention. The query document 500 may be generated on a WAP provisioning server connected to the carrier's or corporate operator's wireless provisioning system. The query request could also be generated from a website on a HTTP server and sent to the WAP provisioning services system.

The typical query document is a configuration message that includes tags that define changes to or queries of settings on a mobile device. The sample query document 500 includes a header portion 510 and a body portion 520. The header portion 510 includes information used by the push router 301 to determine how to handle the query document. The body portion includes statements interpreted by a particular CSP as queries of settings. In the sample query document 500, query statements differ from ordinary declaratory statements by the use of the term "-query"

within the tag. For example, the statement "parm name='LOCALE_IDIGITS' value='3'" is used to set the decimal places in currency format to three. However, the statement "parm-query name='LOCALE_IDIGITS'" denotes a query of the setting. When the query document is processed, the system modifies the "parm-query" statement to recite a "parm" element having the value of the queried setting (e.g., in the form of statement 512), thus transforming the query document into a response document (described later).

Referring now to the sample query document 500, the header portion 510 includes several illustrative headers. As mentioned, the information in the header portion 510 is used by the push router 301 (FIG. 4) to identify the particular application intended to handle the query document. The push router 301 uses the AppID header 511 to identify the client application that will carry out the query request. The AppID header 511 takes the following form:

X-WAP-Application-Id: [Application Identifier]

where the string "Application Identifier" is used to identify the client application that handles the response. The following two examples illustrate the use of this header:

X-WAP-Application-Id:x-wap-microsoft:cfgmgr.ua

X-WAP-Application-Id:x-wap-microsoft:appmgr.ua where the strings "x-wap-microsoft:cfgmgr.ua" and "x-wap-microsoft:appmgr.ua" identify particular client applications intended to handle those configuration messages. It is envisioned, although not necessary, that the configuration manager 401 (FIG. 4) will be identified to handle query documents.

The existence of the response address header 512 indicates to the push router 301 that a response is requested. The response address header 512 takes the form:

X-MS-RESP-ADDR: [value]

where the value associated with the header identifies the address to which the response should be sent, which is passed to the client application. If the response address header 512 is not present in the query document 500, the push router 301 assumes that no response is required. In this case the message is handed down to the identified client application and no response is requested. Typically, this header would be present since it makes little sense to issue a query without requesting a response. Other possible forms of this header include:

X-MS-RESP-ADDR: (1)

which indicates that a response is requested and the return address is the same as the request origination address (Return to Sender)

X-MS-RESP-ADDR: # (2)

which indicates that a response is requested in an SMS format to the specified SMS address. Example: X-MS-RESP-ADDR:sms:<phone-number>[@<SMSC Address>][/<PATH>][?<QUERY>], where the [ ] indicate optional parts of the statement, and the < > indicate names of various segments.

X-MS-RESP-ADDR: HTTP URL (3)

which indicates that a response is requested to be posted using HTTP at the specified URL. Example: X-MS-RESP-ADDR: http://www.operator.com/devconfig?1122

After the push router 301 determines the return address for the response and the handler application, the query document is sent to that application. The client application (typically the configuration manager for queries) processes the rest of the query document.

In this implementation, the response type header 513 is processed by the client application (the configuration manager in this instance). The response type header 513 takes the following form:

X-MS-RESP-TYPE: [value]

The value takes the form "XYZ" where X represents the required response in case of success, Y represents the required response for failure and Z represents whether metadata has to be included within the response. Possible values for X and Y may be N (for no response), S (for short response), and L (for long response). The value for Z is a Boolean type and flags only Y (Yes) or N (No) (include metadata, do not include metadata). The query document 500 requests only a short response as described by the statement X-MS-RESP-TYPE: LLN.

The identified client application (here, the configuration manger) then parses the body of the query document 500 and invokes the respective CSPs according to any characteristic-query elements and parm-query elements. If the query is aimed to retrieve the values of all settings under a certain path, then the characteristic-query element is used. For instance, the following statements invoke a Registry CSP and retrieve settings and values under path "HKCU\COMM\TerminalPreferences\Large":

```
<characteristic type="Registry">
    <characteristic-query type=
        "HKCU\COMM\TerminalPreferences\Large"/>
</characteristic>
```

The following statements invoke the Locale CSP to query the values of settings that determine the number of digits being displayed and the type of currency symbol.

```
<characteristic type="Locale">
    <parm-query name="LOCALE__IDIGITS"/>
    <parm-query name="LOCALE__SCURRENCY"/>
</characteristic>
```

The identified client application (configuration manager) in cooperation with the particular CSPs associated with the queried settings retrieve the values for the querried settings from the settings 405 stored on the mobile device 120. In accordance with the invention, the configuration manager and the push router may cooperate to create a response document containing those retrieved values.

Sample Response Document

Figure 6:
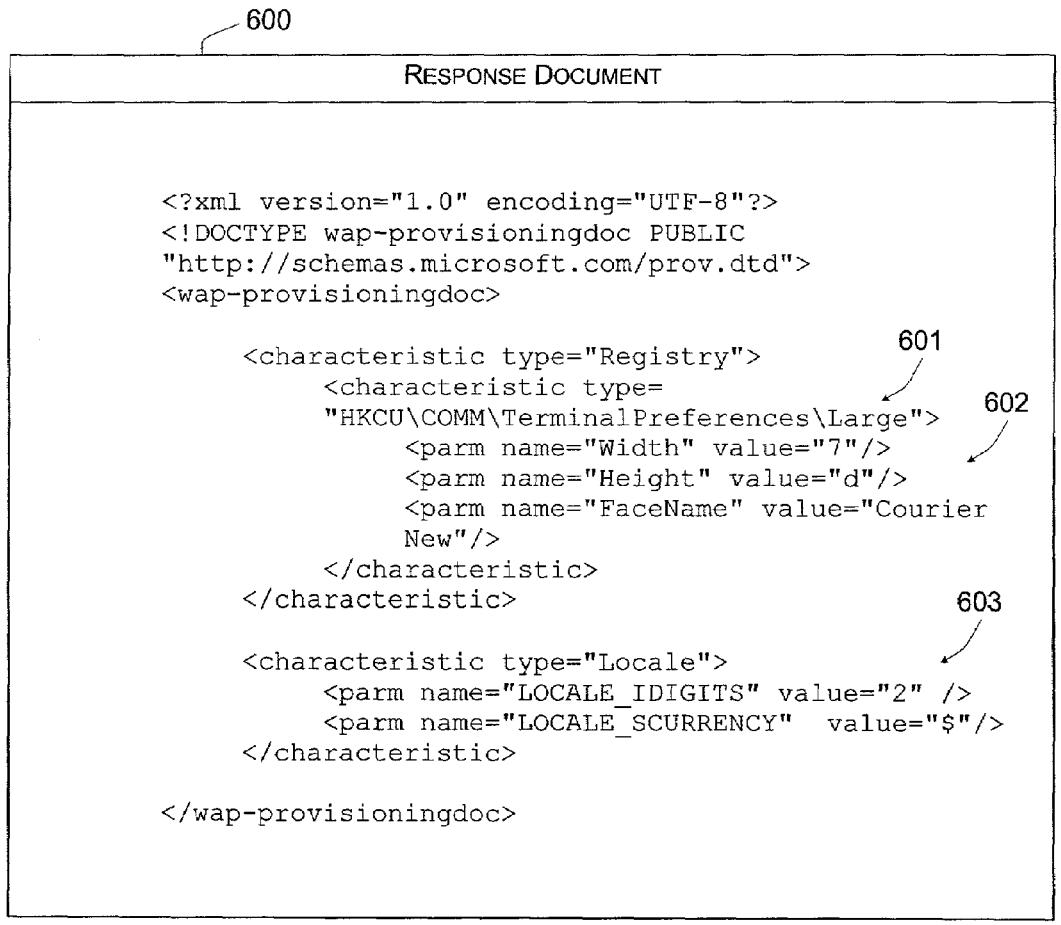
FIG. 6 is a graphical representation of information stored within a response document used by the configuration system implementing the present invention.

FIG. 6 is a graphical representation of one sample response document 600 returned in response to the query document 500 described above. As mentioned, the query document is transformed to a response document by making any query statements (e.g., "parm-query") into declarative statements that include the current setting values (e.g., "parm"). To illustrate that process, note that the query document statement:

```
<characteristic-query
    type="HKCU\COMM\TerminalPreferences\Large"/>
``` has been transformed from a query statement to a declarative statement 601 in the response document:

```
<characteristic
    type="PKCU\COMM\TerminalPreferences\Large">
``` and has been modified in the response document to include the parameter values 602 under the identified path:

```
<parm name="Width" value="7"/>

<parm name="Height" value="d"/>

<parm name="FaceName" value="Courier New"/>
```

Similarly, the parm-query statements in from the query document:

```
<parm-query name="LOCALE_IDIGITS"/>

<parm-query name="LOCALE_SCURRENCY"/>
``` have been transformed in the response document to declarative statements 603 and now include the values of the settings:

```
<parm name="LOCALE_IDIGITS" value="2" />

<parm name="LOCALE_SCURRENCY"
    value="$"/>
```

The Configuration Manager is capable of retrieving and inserting additional data in the response document from the metabase 406 (FIG. 4). If that were the case, the response document would include the additional metadata, which could look as follows:

```
<characteristic type="Locale">
    <parm name="LOCALE_IDIGITS" label="Number of decimal
        places" value="2" datatype="Integer" minvalue="0"
        maxvalue="9"/>
    <parm name="LOCALE_SCURRENCY" label="Currency
        symbol" value="$" datatype="String" options="$;#;%"/>
</characteristic>
```

Method for Querying Settings on a Mobile Device

Figure 7:
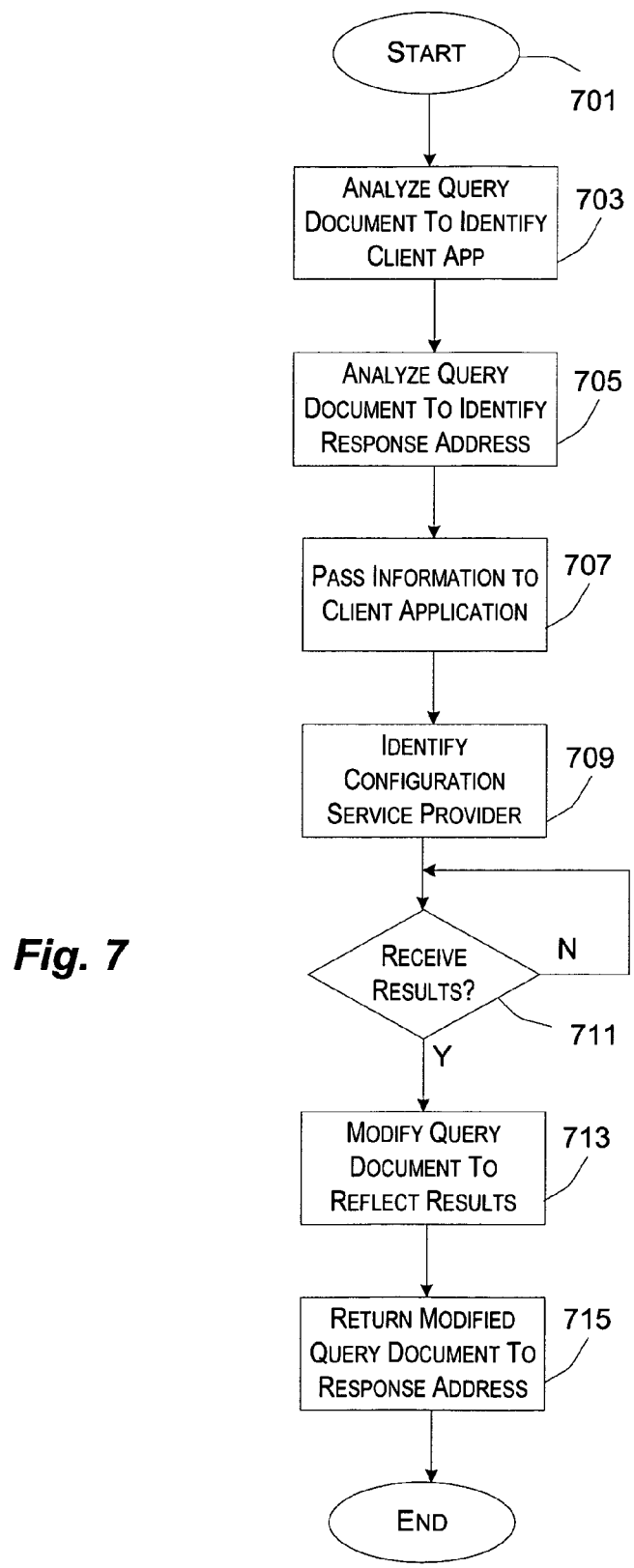
FIG. 7 is a logical flow diagram generally illustrating a process for querying settings on a mobile device in accordance with one implementation of the present invention.

FIG. 7 is a logical flow diagram generally illustrating a process for querying settings on a mobile device. The process 700 illustrated in FIG. 7 is one illustrative process described from the perspective of the push router 301 (FIG. 3) described above. The illustrative process is only one example of such a process and others will become apparent to those skilled in the art. The process 700 enters at beginning step 701 where a query document has been received at a mobile device. The query document includes query statements intended to retrieve the current state of one or more settings stored on the mobile device. At step 703, the query document is analyzed to identify information sufficient to identify a client application registered to handle the particular query statements. For instance, an AppID header may be analyzed to identify the client application, such as a configuration manager. At step 705, the query document is analyzed to identify an address to which any response to the query should be sent. For example, a response address header may provide a return address.

At step 707, the query document (or information derived from it) is passed to the registered client application for processing. At step 709, the client application identifies one or more configuration service providers that handle the affected settings based on the query statements. Alternatively, the client application may be configured to directly maintain the affected settings, in which case configuration service providers could be avoided. At step 711, the client application idles until it receives results from the queries of the settings. For example, the configuration manager may idle or perform other processing until a particular CSP returns a value associated with the identified setting. When results are received, the process continues to step 713.

At step 713, the query document is modified to reflect the values retrieved for the identified setting. As discussed above, in one implementation, the query statements may be transformed to declarative statements that identify the affected settings and their values. Once the query document has been adequately transformed with the values of each of the affected settings, the query document essentially becomes a response document. It should be noted that not all the queried values need be discovered before a response document is sent. Partial response documents are also within the realm of the invention. At step 715, the completed response document is returned to the return address identified above at step 705, thus concluding the process.

The forgoing detailed description illustrates a sample continuous provisioning system capable of implementing the present invention. It will be appreciated by those skilled in the art that the system described above is one embodiment of the invention and that alternatives will also become apparent. For example, the configuration messages may be provided to the system through some mechanism other than the push sources and push router described above. Rather, the configuration messages may be generated locally through a configuration console or application. Alternatively, the configuration messages may be provided to the configuration manager directly over a local area network or the like without resort to a wireless connection. In addition, the security features described may be omitted without rendering the configuration system inoperable.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A mobile device including a computer-readable storage medium having computer-executable components, comprising:
    a router component configured to receive a query document including a query statement related to application configuration settings, the router component being further configured to route at least a portion of the query document;
    a plurality of configuration service provider components configured to access the application configuration settings; and a configuration manager component configured to:
    receive the at least a portion of the query document;
    identify at least one configuration service provider component of the plurality of configuration service provider components that is configured to access application configuration settings implicated by the at least a portion of the query document;
    route the query statement to the at least one configuration service provider component for access to the application configuration settings implicated by the at least a portion of the query document.

2. The computer-readable storage medium of claim 1, wherein the router component is configured to receive query documents from a plurality of push sources, each push source being configured to interact with an external initiator of the query document.

3. The computer-readable storage medium of claim 2, wherein the initiator includes a provisioning server in wireless communication with the mobile device.

4. The computer-readable storage medium of claim 2, wherein the initiator includes a provisioning server in wired communication with the mobile device.

5. The computer-readable storage medium of claim 1, wherein the plurality of configuration service provider components are further configured to retrieve a current value of the setting.

6. The computer-readable storage medium of claim 5, wherein the configuration manager is further configured to modify the query document based on the retrieved value of the setting.

7. The computer-readable storage medium of claim 6, wherein the query statement within the modified query document is modified to include the retrieved value of the setting.

8. A mobile device including a computer-readable storage medium having computer-executable instructions for performing steps, including:
  receiving a configuration message including a payload identifying a particular setting stored on the mobile device;
  parsing the configuration message to identify the particular setting stored on the mobile device;
  determining at least one configuration component of a plurality of configuration components responsible for maintaining a particular setting;
  passing the payload to he at least one configuration component responsible for maintaining the particular setting; and
  retrieving, by the at least one configuration component, a value associated with the particular setting stored on the mobile device.

9. The mobile device of claim 8, wherein the computer-readable storage medium comprises further instructions for returning a response document to an initiator of the configuration message, the response document including the value for the particular setting.

10. The mobile device of claim 8, wherein the plurality of configuration components are associated with a configuration manager programmed to manage a provisioning transaction.

11. The mobile device of claim 8, wherein the plurality of configuration components each comprise a configuration service provider responsible for maintaining the particular setting.

12. A computer-implemented method for querying a setting on a mobile device, comprising:
  receiving a configuration message from an initiator, the configuration message including a payload identifying a particular setting stored on the mobile device;
  determining at least one configuration component of a plurality of configuration components responsible for maintaining the particular setting;
  passing at least the payload to the at least one configuration component responsible for maintaining the particular setting;
  retrieving, by the at least one configuration component, a value associated with the particular setting stored on the mobile device; and
  returning a response document to the initiator of the configuration message, the response document including the retrieved value for the particular setting.

13. The method of claim 12, wherein the plurality of configuration components are associated with a configuration manager programmed to manage a provisioning transaction.

14. The method of claim 12, wherein the plurality of configuration components each comprise a configuration service provider responsible for maintaining the particular setting.

15. A system for maintaining settings on a mobile device, the system comprising:
  a router component configured to receive a query document including a query statement related to application configuration settings stored on the mobile device, the router component being further configured to route at least a portion of the query document; and
  a configuration manager component configured to:
  receive the at least a portion of the query document;
  identify at least one configuration service provider component of a plurality of configuration service provider components that is configured to access application configuration settings implicated by the at least a portion of the query document; and
  route the query statement to the at least one configuration service provider component for access to the application configuration settings implicated by the at least a portion of the query document.

16. The system of claim 15, further comprising a plurality of configuration service provider components associated with the application configuration settings and configured to access the application configuration settings, and wherein the configuration manager is further configured to identify the at least one configuration service provider based on information within the query document, and to pass the at least a portion of the query document to the at least one configuration service provider for processing.

17. The system of claim 16, wherein the at least one configuration service provider is further configured to retrieve a current value of the application configuration setting from the mobile device.

18. The system of claim 17, wherein the configuration manager is further configured to modify the query document based on the retrieved value of the application configuration setting.

19. The system of claim 18, wherein the query statement within the modified query document is modified to include the retrieved value of the application configuration setting.

20. The system of claim 15, wherein the router component is configured to receive query documents from a plurality of push sources, each push source being configured to interact with an external initiator of the query document.

21. The system of claim 20, wherein the external initiator includes a provisioning server in wireless communication with the mobile device.

22. The system of claim 20, wherein the external initiator includes a provisioning server in wired communication with the mobile device.

* * * * *